United States Patent
Myers

(10) Patent No.: US 12,308,396 B2
(45) Date of Patent: May 20, 2025

(54) BATTERY CLEANING DEVICE

(71) Applicant: Robert Myers, Burney, CA (US)

(72) Inventor: Robert Myers, Burney, CA (US)

(*) Notice: Subject to any disclaimer, the term of this patent is extended or adjusted under 35 U.S.C. 154(b) by 366 days.

(21) Appl. No.: 17/964,345

(22) Filed: Oct. 12, 2022

(65) Prior Publication Data

US 2024/0128520 A1    Apr. 18, 2024

(51) Int. Cl.
*B08B 1/30* (2024.01)
*B08B 1/16* (2024.01)
*H01M 10/42* (2006.01)

(52) U.S. Cl.
CPC .............. *H01M 10/42* (2013.01); *B08B 1/165* (2024.01); *B08B 1/30* (2024.01); *H01M 2220/20* (2013.01)

(58) Field of Classification Search
CPC .... A47L 25/00; B25B 27/005; H01M 50/543; H01M 10/42; B08B 1/30
See application file for complete search history.

(56) References Cited

U.S. PATENT DOCUMENTS

| | | | | | |
|---|---|---|---|---|---|
| 1,338,540 A | * | 4/1920 | Wake | ............... | B25B 9/00 81/426.5 |
| 1,741,531 A | * | 12/1929 | Miller | ............... | H01R 43/002 15/104.04 |
| 1,913,606 A | * | 6/1933 | McKenna | ............... | B25B 27/005 15/236.08 |
| 2,003,629 A | * | 6/1935 | Coffey | ............... | H01M 50/543 15/236.05 |
| 2,020,052 A | * | 11/1935 | Fischer | ............... | B25B 27/005 29/246 |
| 2,405,680 A | * | 8/1946 | Williams | ............... | H01M 50/543 7/125 |
| 2,475,514 A | * | 7/1949 | Plumley | ............... | H01M 50/543 30/169 |
| 2,486,851 A | * | 11/1949 | La Ville | ............... | B25B 27/02 29/246 |
| 2,562,136 A | * | 7/1951 | Sullins | ............... | H01M 50/543 D8/90 |
| 2,815,777 A | * | 12/1957 | Iraids | ............... | B25B 5/142 269/254 R |
| 3,745,622 A | * | 7/1973 | DeAmicis | ............... | B23D 71/00 15/236.08 |
| 4,133,069 A | * | 1/1979 | Sunshine | ............... | B08B 1/165 D8/54 |
| 4,255,828 A | * | 3/1981 | Colla | ............... | H01M 50/553 15/236.01 |
| 4,539,873 A | * | 9/1985 | Freed | ............... | B25F 1/003 7/127 |
| 5,023,989 A | * | 6/1991 | Hargrave | ............... | B25B 7/02 29/426.5 |

(Continued)

*Primary Examiner* — Michael D Jennings
(74) *Attorney, Agent, or Firm* — The Iwashko Law Firm, PLLC; Lev Ivan Gabriel Iwashko

(57) ABSTRACT

A battery cleaning device, including a main body, including a first section comprising a first tapered end to remove corrosion around a post of a vehicle battery in response to being move around the post, and a second section movably connected to at least a portion of the first section, the second section comprising a second tapered end to remove the corrosion around the post of the vehicle battery in response to being moved around the post, and a spring disposed between the first section and the second section to bias the first tapered end toward the second tapered end.

6 Claims, 2 Drawing Sheets

(56) References Cited

U.S. PATENT DOCUMENTS

| | | | |
|---|---|---|---|
| 9,566,691 B2* | 2/2017 | Ford | B25B 7/123 |
| 10,376,982 B2* | 8/2019 | Mizutani | B25B 7/02 |
| 2004/0158946 A1* | 8/2004 | Monson | B08B 9/023 |
| | | | 15/104.04 |
| 2015/0372468 A1* | 12/2015 | Motley | H02G 3/22 |
| | | | 174/650 |

* cited by examiner

BATTERY CLEANING DEVICE

BACKGROUND

1. Field

The present general inventive concept relates generally to battery cleaning, and particularly, to a battery cleaning device.

2. Description of the Related Art

A battery for a vehicle can be subject to corrosion over time due to chemicals inside the battery that become exposed to metallic components on the outside of the battery. Cleaning the corrosion can be dangerous as the corrosion can include battery acid that is harmful to touch. Moreover, typical cleaning practices use either cleaning chemicals, grease, and/or protection sprays followed by wiping a surface of the battery with a cloth and/or a sponge.

Thus, current methods for cleaning require actively contacting the surface of the battery with the cloth and/or the sponge, which provides a thin barrier. The cloth and/or the sponge can leak chemicals and expose a user to injury from the chemicals and/or the battery acid.

Therefore, there is a need for a battery cleaning device that effectively cleans a post and/or a terminal of the battery while keeping the user safe.

SUMMARY

The present general inventive concept provides a battery cleaning device.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a battery cleaning device, including a main body, including a first section comprising a first tapered end disposed at a first end of the first section to remove corrosion around a post of a vehicle battery in response to being move around the post, and a second section movably connected to at least a portion of the first section, the second section comprising a second tapered end disposed at a first end of the second section to remove the corrosion around the post of the vehicle battery in response to being moved around the post, and a spring disposed between the first section and the second section to bias the first tapered end toward the second tapered end.

Each the first section and the second section may further include a concave surface disposed on at least a portion of an inner surface to receive wiring thereon.

The concave surface may be disposed outside a boundary of the first tapered end and the second tapered end.

The first tapered end and the second tapered end may move from connected to each other in a first position to at least partially disposed away from each other in a second position in response to an application of force against a second end of the first section and a second end of the second section toward each other.

The first tapered end and the second tapered end may have less width than other portions of the first section and the second section, respectively.

The first tapered end and the second tapered end may be coated with at least one of an anti-corrosion washer and a dielectric grease to prevent buildup of the corrosion thereon.

The battery cleaning device may further include at least one cord receiving aperture disposed on at least a portion of at least one of the first section and the second section to receive wiring of the vehicle battery therethrough.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Battery Cleaning Device 100
Main Body 110
First Section 111
First Tapered End 111a
First Concave Surface 111b
Second Section 112
Second Tapered End 112a
Second Concave Surface 112b
Spring 120
Cord Receiving Apertures 130

Figure 1:
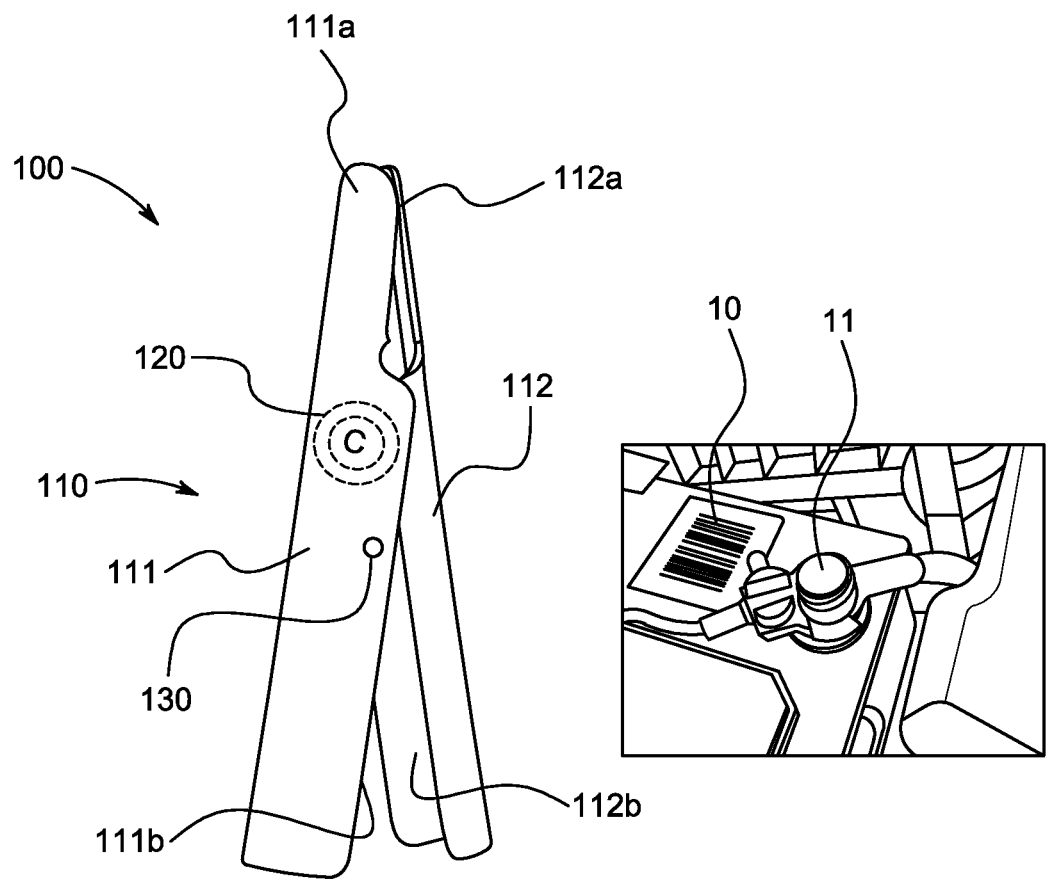
FIG. 1 illustrates a front perspective view of a battery cleaning device, according to an exemplary embodiment of the present general inventive concept.

FIG. 1 illustrates a front perspective view of a battery cleaning device 100, according to an exemplary embodiment of the present general inventive concept.

Figure 2:
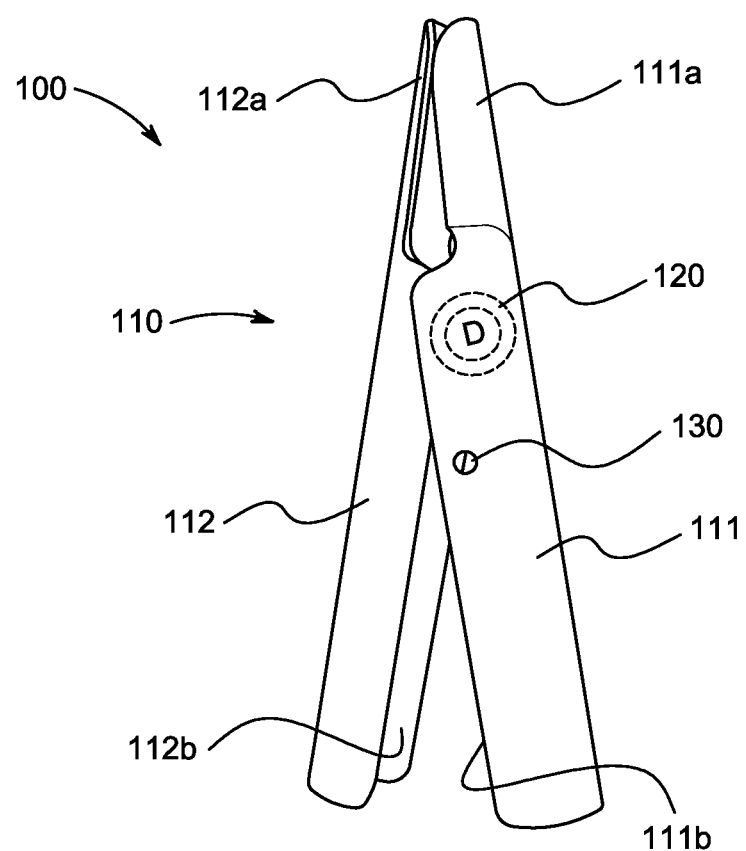
FIG. 2 illustrates a rear perspective view of the battery cleaning device, according to an exemplary embodiment of the present general inventive concept.

FIG. 2 illustrates a rear perspective view of the battery cleaning device 100, according to an exemplary embodiment of the present general inventive concept.

The battery cleaning device 100 may be constructed from at least one of metal, plastic, wood, and rubber, etc., but is not limited thereto.

The battery cleaning device 100 may include a main body 110, a spring 120, and a plurality of cord receiving apertures 130, but is not limited thereto.

The main body 110 may include a first section 111 and a second section 112, but is not limited thereto.

The first section 111 may be movably (i.e., pivotally, rotatably) connected to at least a portion of a second section 112. In other words, the second section 112 may be movably connected to at least a portion of the first section 111. Moreover, the first section 111 and/or the second section 112 may have an elongate shape.

The first section 111 may include a first tapered end 111a and a first concave surface 111b, but is not limited thereto.

The first tapered end 111a may be disposed on at least a portion of a first end of the first section 111. The first tapered end 111a may have a curved shape and/or a convex surface with respect to an outer surface of the first section 111. The first tapered end 111a may have a less curved and/or arcuate shape, and/or less convex shape with respect to other portions of the first section 111. In other words, the first tapered end 111a may be more planar than other portions of the first section 111. Also, the first tapered end 111a may have a length approximately one-third or one-quarter of an entire length of the first section 111. Furthermore, the first tapered end 111a may be smaller in width (e.g., thinner) with respect to other portions of the first section 111.

The first concave surface 111b may be disposed on at least a portion of an inner surface of the first section 111 opposite with respect to the outer surface of the first section 111. The first concave surface 111b may have a curve corresponding to the convex surface on the outer surface of the first section 111. Moreover, the first concave surface 111b may disposed outside a boundary of the first tapered end 111a. As such, the first concave surface 111b may receive wiring thereon, such as from a vehicle battery 10.

The second section 112 may include a second tapered end 112a and a second concave surface 112b, but is not limited thereto.

The second tapered end 112a may be disposed on at least a portion of a first end of the second section 112. The second tapered end 112a may have a curved shape and/or a convex surface with respect to an outer surface of the second section 112. The second tapered end 112a may have a less curved and/or arcuate shape, and/or less convex shape with respect to other portions of the second section 112. In other words, the second tapered end 112a may be more planar than other portions of the second section 112. Also, the second tapered end 112a may have a length approximately one-third or one-quarter of an entire length of the second section 112. Furthermore, the second tapered end 112a may be smaller in width (e.g., thinner) with respect to other portions of the second section 112.

The second concave surface 112b may be disposed on at least a portion of an inner surface of the second section 112 opposite with respect to the outer surface of the second section 112. The second concave surface 112b may have a curve corresponding to the convex surface on the outer surface of the second section 112. Moreover, the second concave surface 112b may disposed outside a boundary of the second tapered end 112a. As such, the second concave surface 112b may receive wiring thereon, such as from the vehicle battery 10.

The spring 120 may be disposed on at least a portion of the first section 111 and/or the second section 112, such that the spring 120 may be disposed between the first section 111 and/or the second section 112. Additionally, referring to FIGS. 1 and 2, the spring 120 may be biased to move the first tapered end 111a and/or the second tapered end 112a toward each other. As such, a second end of the first section 111 and/or a second end of the second section 112 may be biased to move away from each other. Thus, the first tapered end 111a and/or the second tapered end 112a may move from connected to each other in a first position to at least partially disposed away from each other in a second position in response to an application of force (e.g., squeezing) against the second end of the first section 111 and/or the second end of the second section 112 toward each other, such that the first tapered end 111a and/or the second tapered end 112a reciprocally move away from each other. Conversely, an absence of the application of force (e.g., releasing) the second end of the first section 111 and/or the second end of the second section 112 may spring bias the first tapered end 111a and/or the second tapered end 112a toward each other.

Thus, the first tapered end 111a and/or the second tapered end 112a may connect to a post 11 and/or a terminal of the vehicle battery 10. Subsequently, the first tapered end 111a and/or the second tapered end 112a may be moved (i.e., rotated) around the post 11 to remove corrosion around the post 11 of the vehicle battery 10. As such, the first tapered end 111a and/or the second tapered end 112a may cleanse the post 11. Also, the main body 110 may cleanse the post 11 without use of additional chemicals, solvents, sprays, liquids, and/or brushes. Thus, the main body 110 may improve health and/or longevity of the vehicle battery 10. It is important to note that the outer surface of the first section 111 and/or the outer surface of the second section 112 may be convex to prevent corrosion from remaining thereon, such that the corrosion from the vehicle battery 10 may fall off the first section 111 and/or the second section 112. Also, the first tapered end 111a and/or the second tapered end 112a may be coated with an anti-corrosion washer and/or a dielectric grease to prevent buildup of the corrosion thereon.

The plurality of cord receiving apertures 130 may be disposed on at least a portion of the first section 111 and/or the second section 112. More specifically, at least one first of the plurality of cord receiving apertures 130 may be disposed on at least a portion of the first section 111 and at least one second of the plurality of cord receiving apertures 130 may be disposed on at least a portion of the second section 112. As such, the plurality of cord receiving apertures 130 may receive the wiring of the vehicle battery 10 therethrough.

Therefore, the battery cleaning device 100 may clean the post 11 of the vehicle battery 10. Also, the battery cleaning device 100 may keep a user safe by preventing exposure to any corrosion on the vehicle battery 10.

The present general inventive concept may include a battery cleaning device 100, including a main body 110, including a first section 111 comprising a first tapered end 111a disposed at a first end of the first section 111 to remove corrosion around a post 11 of a vehicle battery 10 in response to being move around the post 11, and a second section 112 movably connected to at least a portion of the first section 111, the second section 112 comprising a second tapered end 112a disposed at a first end of the second section 112 to remove the corrosion around the post 11 of the vehicle battery 10 in response to being moved around the post 11, and a spring 120 disposed between the first section 111 and the second section 112 to bias the first tapered end 111a toward the second tapered end 112a.

Each the first section 111 and the second section 112 may further include a concave surface 111b/112b disposed on at least a portion of an inner surface to receive wiring thereon.

The concave surface 111b/112b may be disposed outside a boundary of the first tapered end 111a and the second tapered end 112a.

The first tapered end 111a and the second tapered end 112a may move from connected to each other in a first position to at least partially disposed away from each other in a second position in response to an application of force against a second end of the first section 111 and a second end of the second section 112 toward each other.

The first tapered end 111a and the second tapered end 112a may have less width than other portions of the first section 111 and the second section 112, respectively.

The first tapered end 111a and the second tapered end 112a may be coated with at least one of an anti-corrosion washer and a dielectric grease to prevent buildup of the corrosion thereon.

The battery cleaning device 100 may further include at least one cord receiving aperture 130 disposed on at least a portion of at least one of the first section 111 and the second section 112 to receive wiring of the vehicle battery 10 therethrough.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A battery cleaning device, comprising:
   a main body, comprising:
      a first section comprising a first tapered end disposed at a first end of the first section to remove corrosion around a post of a vehicle battery in response to being move around the post, and
      a second section movably connected to at least a portion of the first section, the second section comprising a second tapered end disposed at a first end of the second section to remove the corrosion around the post of the vehicle battery in response to being moved around the post;
   a spring disposed between the first section and the second section to bias the first tapered end toward the second tapered end, wherein the spring has a central axis; and
   at least one cord receiving aperture disposed on at least a portion of at least one of the first section and the second section to receive wiring of the vehicle battery therethrough, wherein the at least one cord receiving aperture is offset from the central axis of the spring.

2. The battery cleaning device of claim 1, wherein each the first section and the second section, further comprise:
   a concave surface disposed on at least a portion of an inner surface to receive wiring thereon.

3. The battery cleaning device of claim 2, wherein the concave surface is disposed outside a boundary of the first tapered end and the second tapered end.

4. The battery cleaning device of claim 1, wherein the first tapered end and the second tapered end move from connected to each other in a first position to at least partially disposed away from each other in a second position in response to an application of force against a second end of the first section and a second end of the second section toward each other.

5. The battery cleaning device of claim 1, wherein the first tapered end and the second tapered end have less width than other portions of the first section and the second section, respectively.

6. The battery cleaning device of claim 1, wherein the first tapered end and the second tapered end are coated with at least one of an anti-corrosion washer and a dielectric grease to prevent buildup of the corrosion thereon.

* * * * *